United States Patent
Reed et al.

(10) Patent No.: US 8,055,892 B2
(45) Date of Patent: Nov. 8, 2011

(54) PROVISION OF REMOTE SYSTEM RECOVERY SERVICES

(75) Inventors: Michael Reed, Austin, TX (US); Linda Jones Scott, Georgetown, TX (US); Robert Vernon Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 12/176,116

(22) Filed: Jul. 18, 2008

(65) Prior Publication Data

US 2010/0017589 A1 Jan. 21, 2010

(51) Int. Cl.
*G06F 15/177* (2006.01)
(52) U.S. Cl. .................. 713/2; 713/1; 713/100
(58) Field of Classification Search .......... 713/1, 2, 713/100; 714/2, 23
See application file for complete search history.

(56) References Cited

U.S. PATENT DOCUMENTS

| | | | |
|---|---|---|---|
| 5,884,073 A | 3/1999 | Dent | |
| 5,974,547 A | 10/1999 | Klimenko | |
| 6,115,471 A * | 9/2000 | Oki et al. | 380/242 |
| 6,317,826 B1 | 11/2001 | McCall et al. | |
| 6,463,530 B1 | 10/2002 | Sposato | |
| 7,251,725 B2 | 7/2007 | Loison et al. | |
| 2003/0191930 A1* | 10/2003 | Viljoen et al. | 713/1 |
| 2004/0163008 A1* | 8/2004 | Kim | 714/4 |
| 2004/0254978 A1 | 12/2004 | Ibanez et al. | |
| 2006/0020845 A1* | 1/2006 | Broyles et al. | 714/2 |
| 2006/0047946 A1 | 3/2006 | Keith, Jr. | |
| 2009/0292545 A1* | 11/2009 | Mohammed et al. | 705/1 |

OTHER PUBLICATIONS

Gil-Martinez-Abarca et al., "Wake on LAN over Internet as Web Service", IEEE, 2006, pp. 1261-1268.

* cited by examiner

*Primary Examiner* — Dennis M Butler
(74) *Attorney, Agent, or Firm* — C/O & Associates, P.C.; Steven L. Bennett

(57) ABSTRACT

In an illustrative embodiment, a computer implemented method for providing remote system recovery services is provided. The computer implemented method generates bootable system recovery images to form a set of bootable system recovery images, creates a list of authorized users from a set of subscribers, and receives a request for a bootable system recovery image, including a subscriber identifier, to form a received request. The computer implemented method further authenticates the subscriber identifier in the received request and sends the bootable system recovery image to the subscriber. Responsive to a determination that the user selected additional services, the computer implemented method performs the selected services.

16 Claims, 3 Drawing Sheets

PROVISION OF REMOTE SYSTEM RECOVERY SERVICES

BACKGROUND OF THE INVENTION

1. Field of the Invention

The present invention relates generally to an improved data processing system and, more specifically, to a computer implemented method, an apparatus, and a computer program product for providing remote system recovery services.

2. Description of the Related Art

The advent of computers has caused users to rely on them heavily as tools for use every day. Dependence upon computers has become so widespread that many users cannot function without the devices, as well as the information and services the devices provide. However, all computer systems do not operate forever without some form of component failure.

When a system is not able to boot from the system hard drive, an alternate boot choice is needed. Typically, a recovery method involves booting the disabled system from the selection of either a recovery partition, floppy disk, or compact disc (CD) to perform problem determination on the system. Many newer systems sold today have bootable recovery partitions installed to allow customers (or owners) to attempt to recover and restore the machine.

However, older systems and typical home-built systems do not come with such features. The only option for these systems is to use a bootable floppy or compact disc to recover their system. Most novice computer users never think to create a bootable recovery disk while their machine is in good working order to prepare for a situation when the system becomes unbootable through normal boot processes.

Even when the users are able to locate the operating system compact discs that originally came with the system, the recovery options offered are usually quite limited and/or difficult to use. In addition, the use of the floppy or compact disk as a boot image does not always allow for network configuration.

BRIEF SUMMARY OF THE INVENTION

According to one embodiment of the present invention, a computer implemented method for providing remote system recovery services is provided. The computer implemented method generates bootable system recovery images to form a set of bootable system recovery images, creates a list of authorized users from a set of subscribers, and receives a request for a bootable system recovery image, including a subscriber identifier, to form a received request. The computer implemented method further authenticates the subscriber identifier in the received request and sends the bootable system recovery image to the subscriber.

In accordance with another embodiment, a data processing system for providing a service of remote system recovery services is provided. The data processing system comprises a bus, a memory connected to the bus, wherein the memory comprising computer executable instructions, a communication unit connected to the bus, and a processor unit connected to the bus. The processor unit executes the computer executable instructions to direct the data processing system to generate bootable system recovery images to form a set of bootable system recovery images, create a list of authorized users from a set of subscribers, receive a request for a bootable system recovery image, including a subscriber identifier, to form a received request, authenticate the subscriber identifier in the received request, and send the bootable system recovery image to the subscriber.

In accordance with another embodiment, a computer program product for providing a service of remote system recovery services is provided. The computer program product comprises computer-readable recordable medium tangibly embodying computer executable instructions thereon. The computer executable instructions comprise computer executable instructions for generating bootable system recovery images to form a set of bootable system recovery images, computer executable instructions for creating a list of authorized users from a set of subscribers, computer executable instructions for receiving a request for a bootable system recovery image, including a subscriber identifier, to form a received request, computer executable instructions for authenticating the subscriber identifier in the received request, and computer executable instructions for sending the bootable system recovery image to the subscriber.

DETAILED DESCRIPTION OF THE INVENTION

Figure 1:
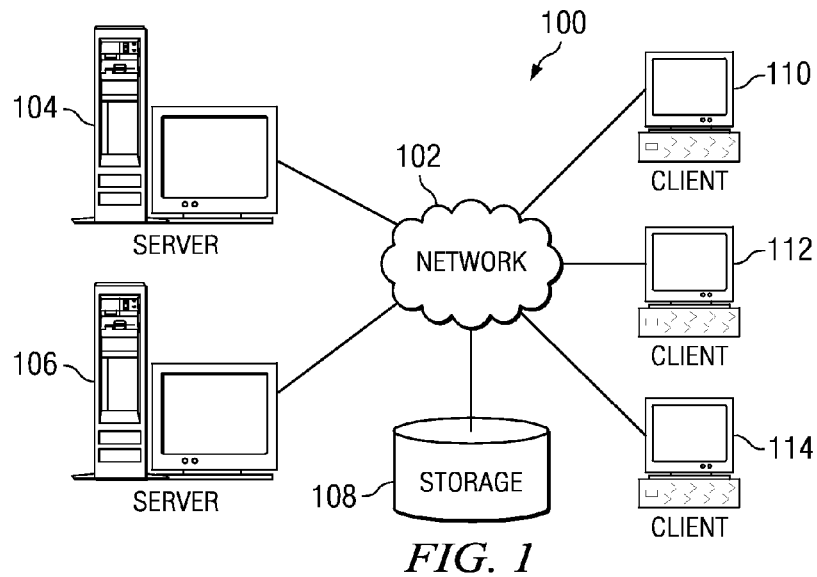
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++ or the like, and conventional procedural programming languages, such as the "C" programming language, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture, including instruction means, which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer implemented process such that the instructions which execute on the computer, or other programmable apparatus, provide processes for implementing the functions/acts specified in the flowchart and/or block diagram block or blocks.

Figure 2:
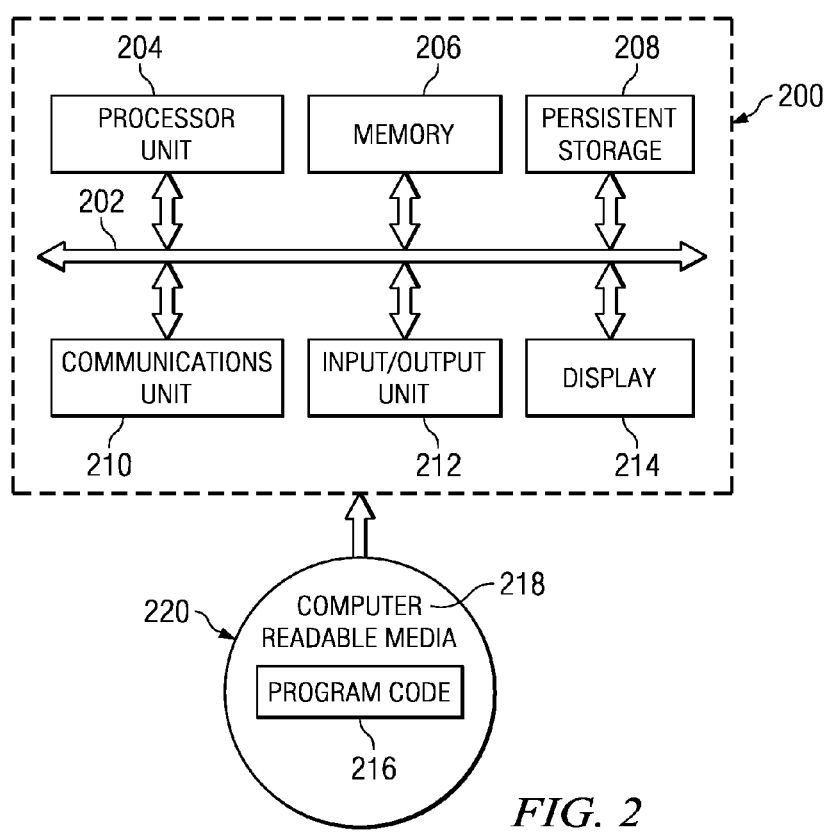
FIG. 2 is a block diagram of a data processing system is shown in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102, along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Using example system 100 of FIG. 1, a broadband service provider on a server such as server 104 packages together a set of bootable system recovery images suitable for subscribers, such as client 110 and client 112. There may be one or more images created, depending on platforms supported, processor architecture or manufacture, and/or levels of recovery provided. The level of recovery may be provided in the form of additional software or service provided once the system boots.

For a specific customer, from a set of customers, such as client 110, who subscribes to the service, the customer modem media access control address (MAC) is entered into a database of pre-boot execution environment (PXE) clients. The set of customers comprises one or more customers and similarly a set of subscribers comprises one or more subscribers. For each subscribing client, there is a suitable boot image and a recovery root file system that is remotely mountable. Remote mount allows the client to access the recovery service on server 104 through network 102, and use the bootable image stored there. When a system of the subscribing user, such as client 110, becomes unbootable, client 110 can switch the basic input/output service (BIOS) of the client system to the pre-boot execution environment that will connect and initiate the remote boot from the image stored on server 104 of the service provider.

Switching to the pre-boot execution environment enables the client system to boot to the system hosted by the respective broadband provider. The service provider may have a Linux™-based file system, to contain the bootable recovery images, due to its file system compatibilities with file systems of operating systems such as Apple® OSX (available from Apple Inc.) and Windows® operating systems (available from Microsoft Inc.). Once booted, the service of the recovery system operating on client 110 can offer several different recovery applications and procedures to help the customer. Additionally, when a customer service representative of the service provider on server 104 is also involved, the service representative may aid in the recovery of the system or the data, depending upon the situation related to the system failure.

With reference now to FIG. 2, a block diagram of a data processing system is shown, in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information, either on a temporary basis and/or a permanent basis. Memory 206, in these examples, may be, for example, a random access memory or any other suitable volatile, or non-volatile, storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto, or transferred to, data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory, that is connected to data processing system 200. The tangible form of computer-readable media 218 is also referred to as computer-recordable storage media. In some instances, computer-readable media 218 may not be removable.

Alternatively, program code 216 may be transferred to data processing system 200 from computer-readable media 218 through a communications link to communications unit 210, and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system, including components in addition to, or in place of, those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
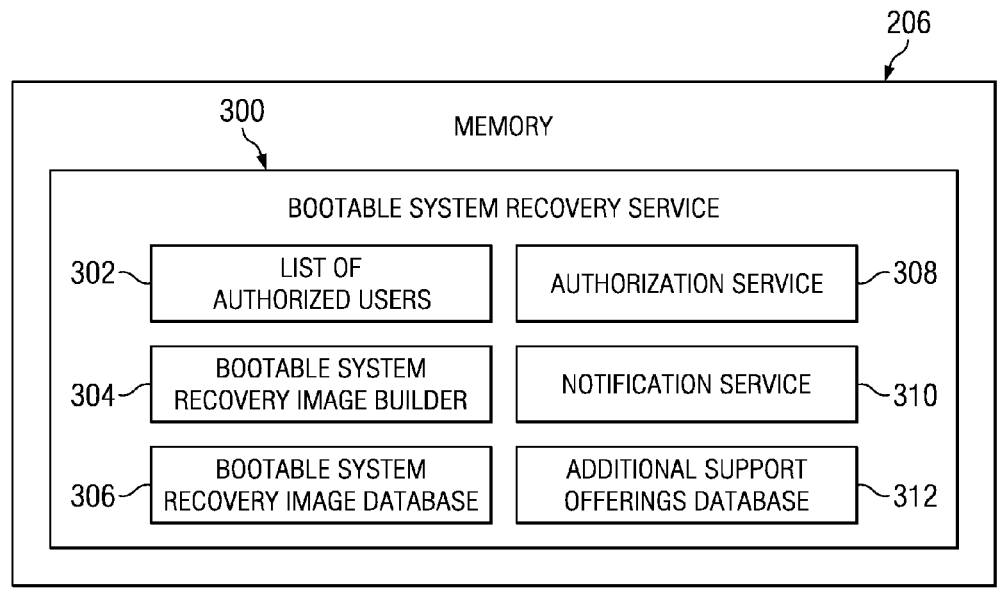
FIG. 3 is a block diagram of components of a bootable system recovery service, in accordance with illustrative embodiments.

With reference to FIG. 3, a block diagram of components of a bootable system recovery service, in accordance with illustrative embodiments is shown. Bootable system recovery service 300 is shown within memory 206 of system 200 of FIG. 2. System 200 in this example may be implemented as server 104 of system 100 of FIG. 1.

Bootable system recovery service 300 contains a number of components including list of authorized users 302, bootable system recovery image builder 304, bootable system recovery image database 306, authorization service 308, notification service 310, and additional support offerings database 312. The set of services and data provide a deliverable service solution via a network, such as network 102 of FIG. 1, to clients having a need to recover a disabled system.

List of authorized users 302 is a set of subscribers that have agreed to receive a service offering from the remote service provider. The service offering may be in the form of a bootable image or a bootable image plus additional services, such as problem-determination support and re-configuration aid. A client typically subscribes prior to receiving a service.

Bootable system recovery image builder 304 provides a capability of the service provider system to create system images as needed for the set of clients being supported. For example, if clients require a selection of images based on specific platforms, an image will be built for each target system. Additionally, custom images based on the platform image may also be created to satisfy a specific customer need.

Bootable system recovery image database 306 is a repository of previously created system images. These images may be retrieved selectively by a subscriber requesting a recoverable system during a recovery session operation. The repository provides a set of ready-to-use system images to facilitate client recovery.

Authorization service 308 provides a capability of verifying that a requesting user is a valid subscriber, and is eligible to receive a service or system recovery image from bootable system recovery image database 306. Authorization service 308 may also verify the settings of the user system, in addition to user identifier information, to further validate system settings for downloading of the system recovery image.

Notification service 310 provides feedback to the requesting subscriber or prospective client. The feedback may be a response to an authorization request or a request to enroll as a subscriber. The service also provides communication of response files, such as those needed to initiate a further download. Notification service 310 typically interfaces with the message system of the service provider to provide the communication capability.

Additional support offerings database 312 provides services and products that may be used to enhance the basic provision of a system recovery image. For example, a service may be offered to perform examination of the client system in a problem determination mode after the system has been recovered. A product may be offered to scan a client system for possible problem areas, or to adjust system settings, to improve performance or reliability of the client system. Such products may be downloaded to the client or executed remotely, as needed. An additional service offering may be performed by the client, the service provider or a combination of both and may include, but is not limited to tools, procedures and tips to improve the subscriber system.

Figure 4:
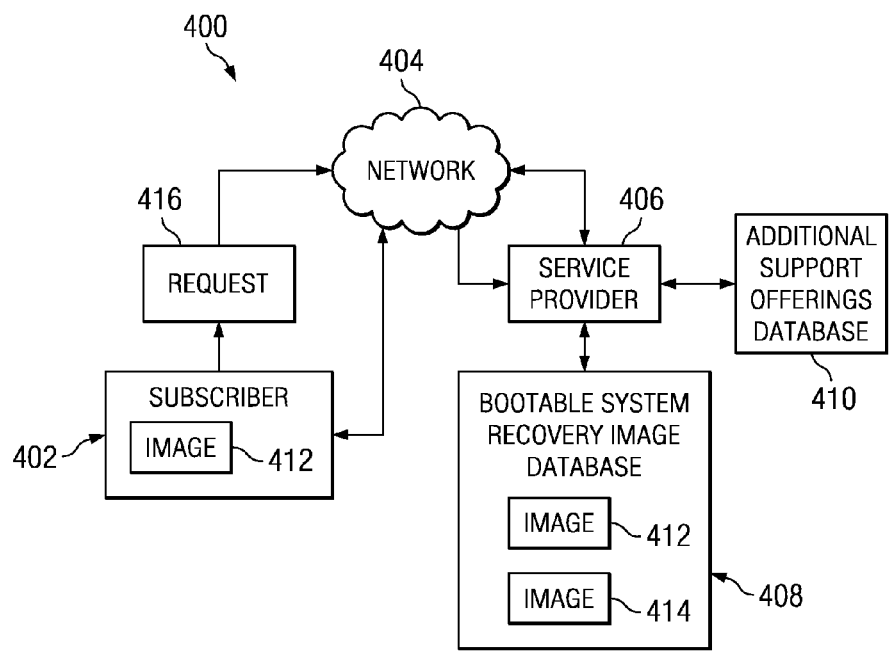
FIG. 4 is a block diagram of a bootable system recovery system, in accordance with illustrative embodiments.

With reference to FIG. 4, a block diagram of a bootable system recovery system, in accordance with illustrative embodiments is shown. As shown in an example embodiment, bootable system recovery system 400 is centered on main components of network 404, which connects subscriber 402 with service provider 406. Service provider 406 has access to bootable system recovery image database 408 and additional support offerings database 410. Bootable system recovery system 400 supports pre-boot execution environment (PXE), allowing computer systems to be booted using a network interface independent of an available storage device or an installed operating system. Subscriber 402 has the pre-boot execution environment firmware installed.

The pre-boot execution environment was introduced by Intel Incorporated as part of a wired-for-management initiative. A specification describing the framework was published by Intel and Systemsoft Corporation on Sep. 20, 1999. The specification uses a set of established network protocols and identification mechanisms, and extends the firmware of the pre-boot execution environment client and the system to be bootstrapped for recovery, with a set of predefined application programming interfaces. During a recovery process, the pre-boot execution environment firmware on the client locates the service provider and engages in a dialog. Through the recovery process over the network, the pre-boot execution environment firmware causes a system image to be located on a service provider and installed on the client. The download of the needed recovery image typically uses trivial file transfer protocol (TFTP), while the location services typically uses dynamic host configuration protocol (DHCP), an Internet protocol for automating the configuration of computers that use transmission control program/internet protocol (TCP/IP) as a commonly used communication protocol.

Within bootable system recovery image database 408 may be found image 412 and image 414 as examples of bootable system images to be used selectively by subscriber 402 as required. Bootable system images may be specific to an operating system platform or further tailored to meet specific requirements of a subscriber.

Request 416 for a system recovery image, including a subscriber identifier, is initiated by subscriber 402. A subscriber identifier may be a universally unique identifier (UUID), a media access control address (MAC), or Ethernet hardware address (EHA) that is a hardware address or adapter address that is a quasi-unique identifier attached to most network adapters, such as a network interface card. Request 416 flows through network 404 to service provider 406, where the request is verified and resolved.

For example, subscriber 402 encounters a boot failure and desires to recover. The recovery process requests an image 412 from service provider 406. The pre-boot execution environment on subscriber 402 retrieves image 412 via a network bootstrap program loaded into the memory of subscriber 402, and is then able to reboot from the retrieved image. The network bootstrap program loaded into the memory of subscriber 402 may typically be the first segment of code received from the service provider.

Figure 5:
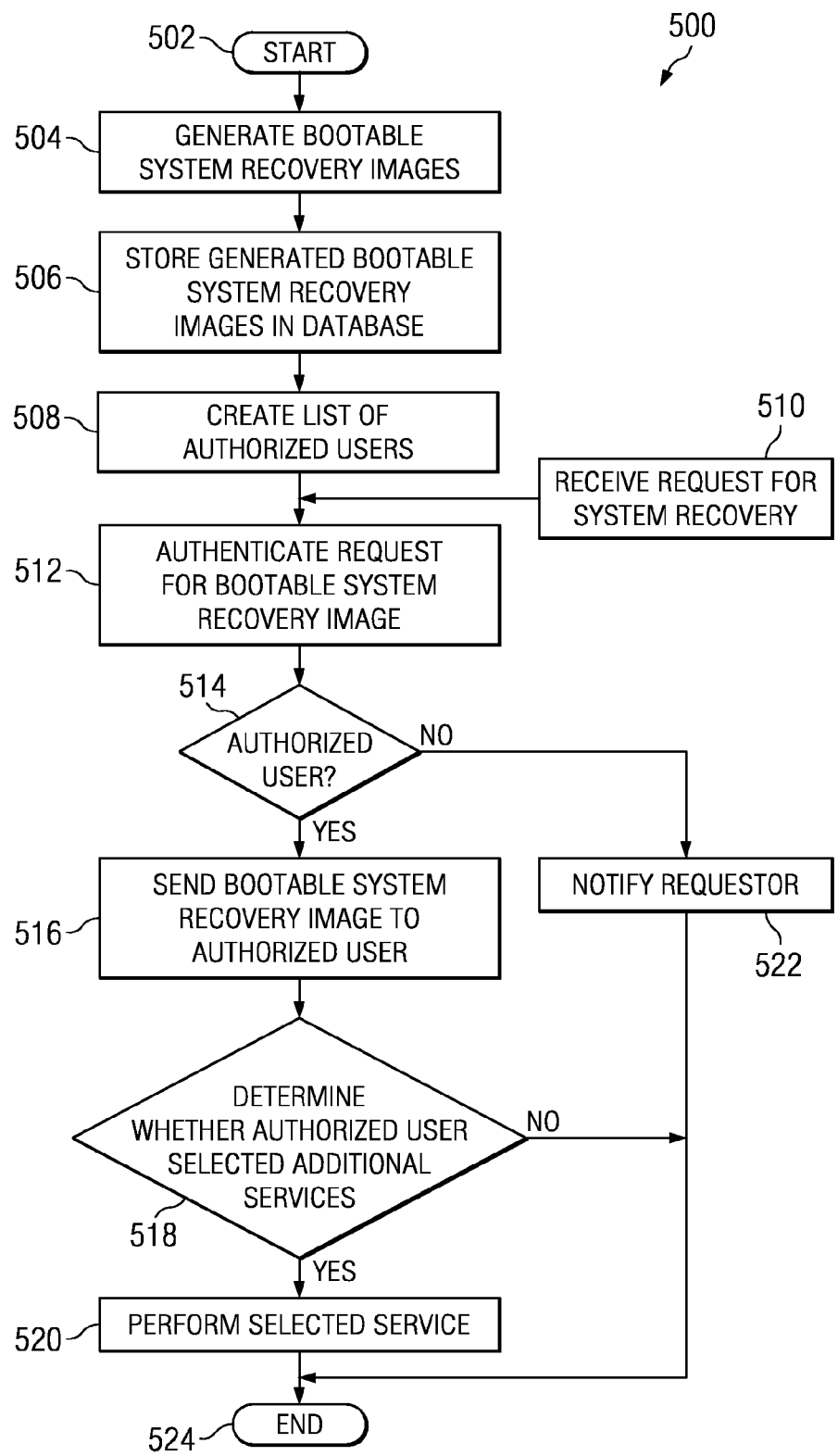
FIG. 5 is a flowchart of a process using a bootable system recovery service, in accordance with illustrative embodiments.

With reference to FIG. 5, a flowchart of a process using a bootable system recovery service, in accordance with illustrative embodiments, is shown. Process 500 is an example of use of bootable recovery service 300 of FIG. 3 in the bootable system recovery system 400 of FIG. 4.

Process 500 begins (step 502) and generates bootable system recovery images (step 504). The bootable system recovery images may be generated to support a planned variety of operating system platforms, and can be created to support typical environments of the individual platforms. Additional images may be created, based on more specific requirements of client subscribers. The added images may be tailored to suit a specific customer implementation, or may be directed to a very simple initial implementation to allow service personnel access to a system for further work and repair. The generated images are then stored as a set of bootable system recovery images in a database (step 506). The database may be a suitable storage area as maintained by a file system, and is not intended to be limited to a database implementation. The set of bootable system recovery images contain a plurality of images representing different operating system platforms and subscriber-unique images.

Create list of authorized users is performed to provide a list of subscribers permitted to use and access services of the service provider (step 508). Using a fee-based example, a user would pay the service provider for the opportunity to use the service when needed. The service provider makes the service available and maintains the images needed by the subscriber. The list of subscribers comprises a set of users that have subscribed to the service.

Recovery of a subscriber system is initiated by a receive request for system recovery by the service provider (step 510). The request is typically initiated by the firmware on the subscriber system, but a subscriber voice may also be used to commence the recovery. Authenticate request for bootable system recovery image is performed to verify whether the subscriber is permitted to access the services and products of the service provider (step 512). Authentication may also provide information related to the specific system to be recovered. A determination is made as to whether the subscriber is an authorized user (step 514). When the request is for an authorized user, a "yes" result is obtained. When the request if from a user that is not authorized, a "no" result is obtained. When a "no" is obtained in step 514, an indication of the failed authorization is sent as a notify requester operation (step 522), with process 500 terminating thereafter (step 524). Notification may be in the form of a message or other suitable means of alerting the requester. For example, if the authorization failed, the firmware may timeout with a suggestion of the cause of the timeout as being one of several causes, including authorization failure.

When a "yes" is returned in step 514, the service provider will send bootable system recovery image to the authorized user or subscriber (step 516). The initial download may include a network bootstrap program which may then load additional files needed for the remote boot operation. A determination is made as to whether the authorized user selected additional services (step 518). Additional services may also include products requiring further download of files. Services may be other free or fee-based offerings desired by the subscriber related to recovery, performance or maintenance of the subscriber system.

When additional services are selected, a "yes" is obtained in step 518. When no additional services are requested, a "no" result is obtained. When a "no" is obtained in step 518, process 500 terminates thereafter (step 524). When as "yes" is obtained in step 518, perform the selected service causes the subscriber selected services to be initiated (step 520), with process 500 terminating thereafter (step 524). As stated previously, the services may also include product offerings, and the services may involve additional processing regarding the recovery of the subscriber system.

In an illustrative embodiment, a service made available by a provider offers system recovery images from which a subscriber may receive a selected system recovery image is described. The service may also provide additional services and products to enhance the recovery operation for or the result of the subscriber. The service is typically offered across a broadband network to enable easier connectivity, rapid response, and bandwidth to support the file transfer. The service is offered as a subscription service to users who become subscribers of the service.

The flowchart and block diagrams in the figures illustrate the architecture, functionality, and operation of possible implementations of systems, methods and computer program products, according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, or remote printers or storage devices, through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer implemented method for providing a service of remote system recovery services, the computer implemented method comprising:
    generating bootable system recovery images to form a set of bootable system recovery images;
    creating a list of authorized users from a set of subscribers, wherein each subscriber of the set of subscribers has a client computer comprising a pre-boot execution environment firmware installed therein, and wherein the client computer, responsive to the client computer becoming unbootable, is configured to run the pre-boot execution environment and send a request for a remote boot from a bootable system recovery image stored on a server of a service provider;
    receiving the request for the remote boot from the bootable system recovery image, including a subscriber identifier, to form a received request;
    authenticating the subscriber identifier in the received request; and
    sending the bootable system recovery image to the client computer of the subscriber, wherein the remote boot from the bootable system recovery image stored on the server of the service provider further includes performing examination of the client computer in a problem determination mode after the client computer has been recovered.

2. The computer implemented method of claim 1 further comprising:
    storing the set of bootable system recovery images in a storage area, wherein the set of bootable system recovery images comprising a plurality of images representing different operating system platforms and subscriber unique images.

3. The computer implemented method of claim 1, wherein creating a list of authorized users from a set of subscribers further comprises:
    receiving a request from a user to subscribe to the remote system recovery services; and
    receiving a predetermined payment from the user for use of the remote system recovery services.

4. The computer implemented method of claim 1, wherein sending the bootable system recovery image to the subscriber further comprises:
    sending a network bootstrap program in response to receiving the request for a bootable system recovery image; and
    determining whether the request includes selected additional services.

5. The computer implemented method of claim 4 further comprising:
    responsive to determining the request, includes selected additional services, performing the selected additional services in addition to the sending of the bootable system recovery image to the subscriber, wherein the selected additional services include a service to scan the client computer for possible problem areas to improve performance or reliability of the client computer and a service to adjust system settings of the client computer to improve performance or reliability of the client computer.

6. A data processing system for providing a service of remote system recovery services, the data processing system comprising:
    a bus;
    a memory connected to the bus, wherein the memory comprising computer executable instructions;
    a communication unit connected to the bus;
    a processor unit connected to the bus, wherein the processor unit executes the computer executable instructions to direct the data processing system to:
    generate bootable system recovery images to form a set of bootable system recovery images;
    create a list of authorized users from a set of subscribers, wherein each subscriber of the set of subscribers has a client computer comprising a pre-boot execution environment firmware installed therein, and wherein the client computer, responsive to the client computer becoming unbootable, is configured to run the pre-boot execution environment and send a request for a remote boot from a bootable system recovery image stored on a server of a service provider;
    receive the request for the remote boot from the bootable system recovery image, including a subscriber identifier, to form received request;
    authenticate the subscriber identifier in the received request; and
    send the bootable system recovery image to the client computer of the subscriber wherein the remote boot from the bootable system recovery image stored on the server of the service provider further includes performing examination of the client computer in a problem determination mode after the client computer has been recovered.

7. The data processing system of claim 6, wherein the processor unit further executes the computer executable instructions to direct the data processing system to:
    store the set of bootable system recovery images in a storage area, wherein the set of bootable system recovery images comprising a plurality of images representing different operating system platform images and subscriber unique images.

8. The data processing system of claim 6, wherein the processor unit executes the computer executable instructions to direct the data processing system to create a list of authorized users from a set of subscribers further comprises:
    direct the data processing system to receive a request from a user to subscribe to the remote system recovery services; and direct the data processing system to receive a predetermined payment from the user for use of the remote system recovery services.

9. The data processing system of claim 6, wherein the processor unit executes the computer executable instructions to direct the data processing system to send the bootable system recovery image to the subscriber further comprises:
direct the data processing system to send a network bootstrap program in response to receiving the request for a bootable system recovery image; and
direct the data processing system to determine whether the request includes selected additional services.

10. The data processing system of claim 9, wherein the processor unit executes the computer executable instructions to direct the data processing system to:
respond to determining the request includes selected additional services, and perform the selected additional services in addition to the sending of the bootable system recovery image to the subscriber, wherein the selected additional services include a service to scan the client computer for possible problem areas to improve performance or reliability of the client computer and a service to adjust system settings of the client computer to improve performance or reliability of the client computer.

11. A computer program product for providing a service of remote system recovery services, the computer program product comprising:
a computer-readable recordable medium tangibly embodying computer executable instructions thereon, the computer executable instructions comprising:
computer executable instructions for generating bootable system recovery images to form a set of bootable system recovery images;
computer executable instructions for creating a list of authorized users from a set of subscribers, wherein each subscriber of the set of subscribers has a client computer comprising a pre-boot execution environment firmware installed therein, and wherein the client computer, responsive to the client computer becoming unbootable, is configured to run the pre-boot execution environment and send a request for a remote boot from a bootable system recovery image stored on a server of a service provider;
computer executable instructions for receiving the request for the remote boot from the bootable system recovery image, including a subscriber identifier, to form a received request;
computer executable instructions for authenticating the subscriber identifier in the received request; and
computer executable instructions for sending the bootable system recovery image to the client computer of the subscriber, wherein the remote boot from the bootable system recovery image stored on the server of the service provider further includes performing examination of the client computer in a problem determination mode after the client computer has been recovered.

12. The computer program product of claim 11 further comprises:
computer executable instructions for storing the set of bootable system recovery images in a storage area, wherein the set of bootable system recovery images comprising a plurality of images representing different operating system platforms and subscriber unique images.

13. The computer program product of claim 11, wherein computer executable instructions for creating a list of authorized users from a set of subscribers further comprises:
computer executable instructions for receiving a request from a user to subscribe to the remote system recovery services; and
computer executable instructions for receiving a predetermined payment from the user for use of the remote system recovery services.

14. The computer program product of claim 11, wherein computer executable instructions for sending the bootable system recovery image to the subscriber further comprises:
computer executable instructions for sending a network bootstrap program in response to receiving the request for a bootable system recovery image; and
computer executable instructions for determining whether the request includes selected additional services.

15. The computer program product of claim 14 further comprises:
computer executable instructions responsive to determining the request includes selected additional services, for performing the selected additional services in addition to the sending of the bootable system recovery image to the subscriber, wherein the selected additional services include a service to scan the client computer for possible problem areas to improve performance or reliability of the client computer and a service to adjust system settings of the client computer to improve performance or reliability of the client computer.

16. A computer implemented method for providing a service of remote system recovery services, the computer implemented method comprising:
generating bootable system recovery images by a service provider to form a set of bootable system recovery images;
storing the set of bootable system recovery images in a bootable system recovery image database, wherein the set of bootable system recovery images comprises a plurality of images representing different operating system platforms and subscriber unique images;
creating a list of authorized users from a set of subscribers by receiving a first request through a network from a set of users to subscribe to the remote system recovery services, wherein each subscriber of the set of subscribers has a client computer comprising a pre-boot execution environment firmware installed therein, and wherein the client computer, responsive to the client computer becoming unbootable, is configured to run the pre-boot execution environment and send a second request for a remote boot; and
receiving a predetermined payment from each subscriber for use of the remote system recovery services;
receiving the second request at the service provider from a subscriber through the network for a bootable system recovery image, including a subscriber identifier, to form a received request;
authenticating the subscriber identifier in the received request; and
sending the bootable system recovery image from the service provider to the client computer of the subscriber by sending a network bootstrap program in response to receiving the request for a bootable system recovery image;
determining whether the request includes selected additional services
responsive to a determination that the request includes selected additional services, obtaining the selected additional services from an additional support offerings database of the service provider and performing the selected additional services, wherein the selected additional services include performing examination of the client computer in a problem determination mode after the client computer has been recovered.

* * * * *